Sept. 15, 1964  J. H. LEMELSON  3,148,535
WHEEL INSPECTION APPARATUS
Filed Aug. 18, 1959  3 Sheets-Sheet 1

INVENTOR.
Jerome H. Lemelson

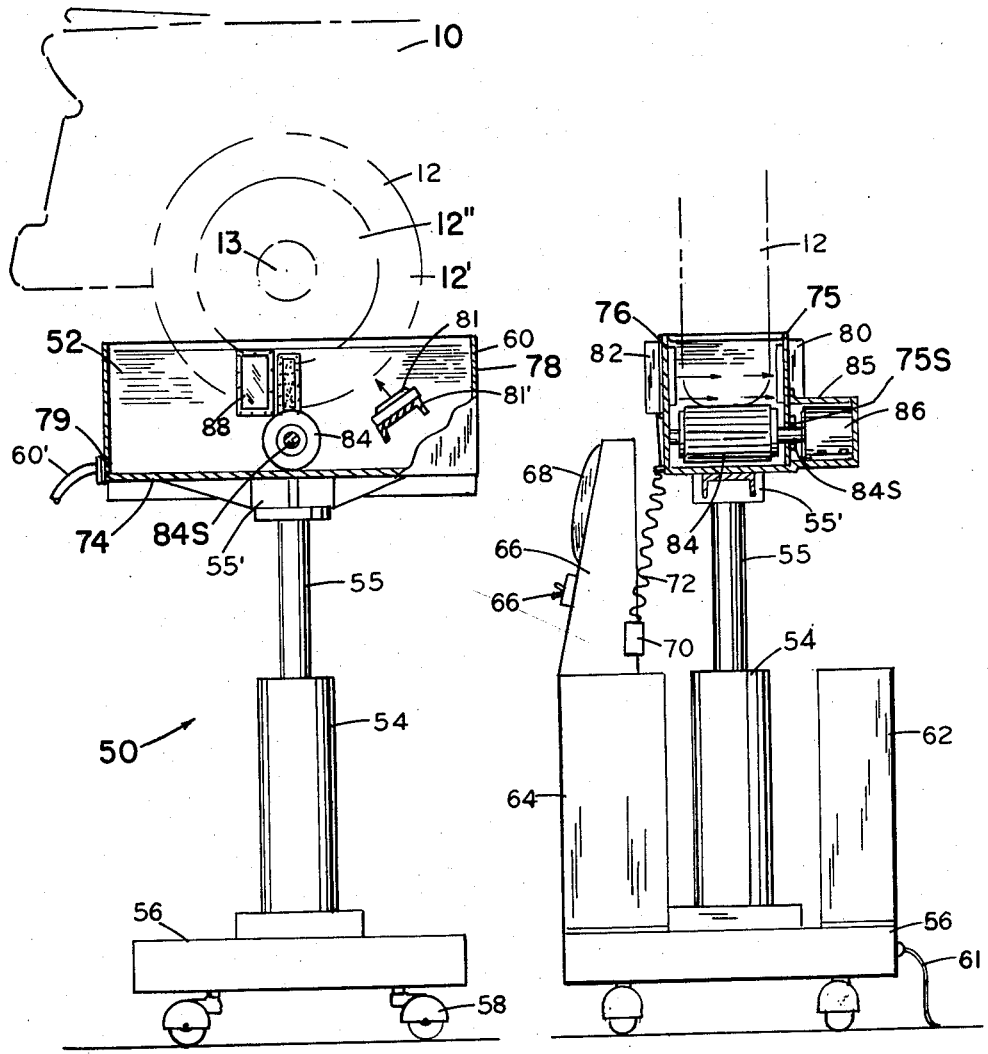

INVENTOR.
Jerome H. Lemelson

United States Patent Office 3,148,535
Patented Sept. 15, 1964

3,148,535
WHEEL INSPECTION APPARATUS
Jerome H. Lemelson, 8B Garfield Apts., Metuchen, N.J.
Filed Aug. 18, 1959, Ser. No. 834,496
11 Claims. (Cl. 73—67.5)

This invention relates to apparatus for inspecting vehicle wheels and in particular to a wheel or tire inspection fixture adapted to permit the inspection of the materials of which a vehicle wheel is made without removal of said wheel from said vehicle.

It is known in the art to determine the physical characteristics of the material beneath the surfaces of articles by wave radiation and/or the reflection of waves from discontinuities or changes in density of said material. Apparatus employing ultrasonic waves and equipment operating by means of the so-called "pulse-echo" principle which utilizes reflections of pulsed waves within the material to provide a visual indication of flaws or density changes in the material, is known in the art and has been employed for inspecting metal and non-metallic materials such as plastic and rubber. Said apparatus generally includes in addition to a source of pulsed high frequency electrical energy for vibrating an ultrasonic transducer such as a piezo-electric crystal or material such as barium-titanante, circuitry which is generally connected to the same crystal for converting the distortions in said crystal due to reflected wave energy into electrical signals which signals when amplified may be used to modulate a visual display writing means such as a cathode ray video or storage tube in a manner to present a trace of the resulting scan or wave characteristic. By analysis of the trace, certain of the physical characteristics of the medium through which the waves generated by the same transducer may be determined including the location of flaws or density changes therein caused by foreign bodies, changes in shape, etc.

This invention is primarily concerned with apparatus for the inspection of the internal condition of the wheels of a vehicle without their removal therefrom and while it is primarily concerned with the inspection of the tires of motor vehicles, such as automobiles and trucks, it is noted that this same apparatus may be applied with certain modifications thereto to any vehicle such as aircraft and railway trains for inspecting the wheels thereof.

It is a primary object of this invention to provide new and improved apparatus for inspecting the internal characteristics of the wheels of vehicles without removal of said wheels from their rotational mounts on the vehicles.

Another object is to provide improved apparatus for inspecting the tires of motor vehicles and the like for internal flows or faults in the rubber thereof, and for locating punctures and foreign bodies therein without the need for removing said tires from the wheels on which they are mounted.

Another object is to provide a new and improved portable inspection fixture for investigating the internal characteristics of the wheels of a motor vehicle while on said vehicle which apparatus includes means for rotating said wheels and means for continuously scanning a predetermined cross-section of a wheel as it is rotated in a manner whereby a predetermined annular area of the wheel may be totally scanned during a complete rotation of the wheel.

Another object is to provide an improved apparatus for scanning a vehicle wheel which includes means for automatically scanning a predetermined area of said wheel and intermittently rotating said wheel, after scanning, a degree whereby the area just scanned will substantially move out of the scanning field and a new area will be moved into said scanning field whereby the entire area of an annular wall of said wheel may be scanned during one rotation of said wheel.

The invention also consists of certain new and original features of construction and combination of parts hereinafter set forth as claimed.

The nature of the invention, as to its objects and advantages, the mode of its operation and the manner of its organization, may be better understood by referring to the following description, taken in connection with the accompanying drawings forming a part thereof in which:

FIG. 4 is a side view with parts broken away for clarity, of a portable inspection apparatus;

FIG. 5 is an end view of FIG. 4 with parts added and other parts broken away;

Figure 1:
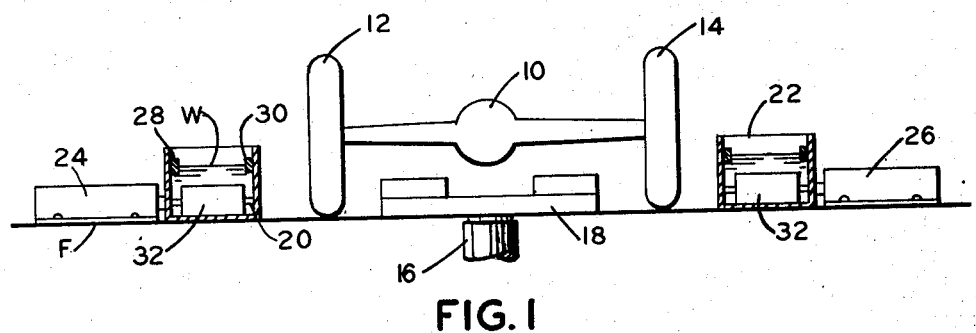
FIG. 1 is an end elevation of apparatus for inspecting the wheels of a motor vehicle including a representative part of said vehicle.
Figure 2:
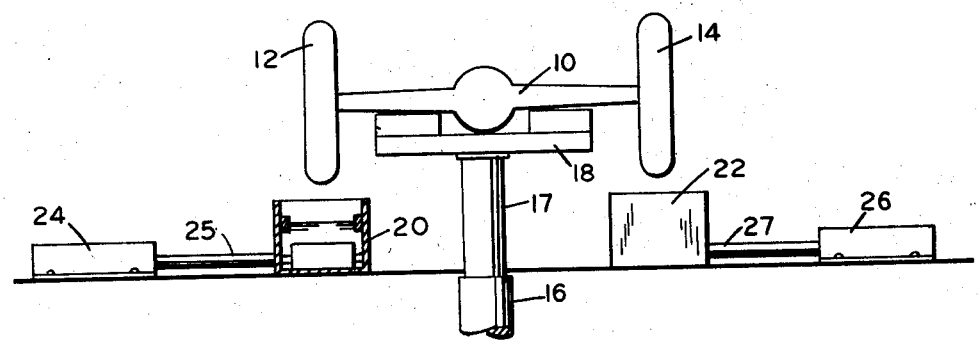
FIG. 2 is the same as FIG. 1 with the vehicle raised and parts of the apparatus positioned under respective wheels.
Figure 3:
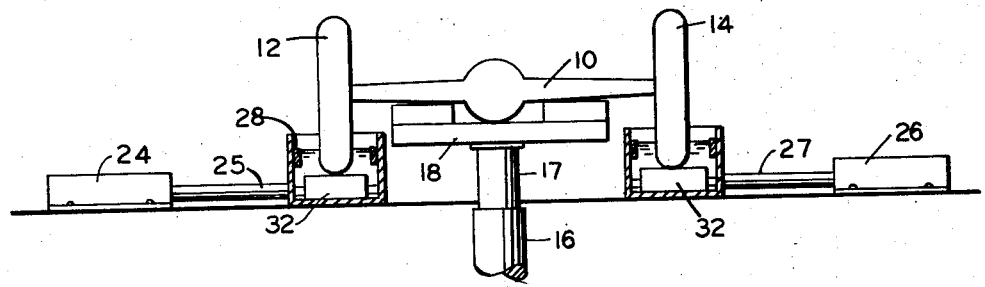
FIG. 3 is the same as FIG. 2 with the vehicle lowered and the wheels thereof depending into respective inspection apparatus.

FIGS. 1 to 3 diagrammatically illustrate the sequence of movements required for prepositioning a motor vehicle in apparatus for automatically inspecting the four rubber tires of said vehicle for internal flaws, cracks or tears. The vehicle is represented by the axle or frame 10 on both sides of which is shown a pair of wheels having the notations 12 and 14, it being understood that there are at least two more wheels on the vehicle which will simultaneously or in order be processed and inspected as described hereafter during the inspection of the wheels illustrated. The vehicle is driven over a lifting fixture which is illustrated as comprising in part a hydraulic cylinder 16 which is rigidly secured in the floor or base F for said apparatus and is adapted when operated by a remote control therefor to raise a ramp or lifting platform 18 which engages the frame, axles or body of the vehicle and lifts it upward as shown in FIG. 2.

The inspection apparatus includes a plurality of pans or tanks 20 and 22 which are positionable by means of respective servo cylinders 24 and 26 from the retracted positions illustrated in FIG. 1 to the projected positions of FIG. 2 when the wheels have been lifted on 18 sufficiently high to clear the tops of the tanks 20 and 22. The tanks 20 and 22 are open at the top and are preferably long enough to each accommodate the front and rear wheels of the respective side of the vehicle 10. The notation 32 refers to a means which is movably mounted in each tank for frictionally engaging and causing a respective of the vehicle wheels to rotate at a predetermined speed when said wheels are lowered into the respective tanks as illustrated in FIG. 3. The cylinder 16 is preferably controlled in its operation to lower the vehicle so that the tires just make contact with the respective drive means 32 a degree such that said tires will be rotated when the drive means is operated. In this way the tire will not be distorted by the weight of the vehicle. The notations 25 and 27 refer to respective shafts of the hydraulic or air cylinders 24 and 26, which shafts are secured to the sidewalls of said tanks. The tanks may be slid across the upper surface of the floor or moved on rails mounted thereon to respective positions under the wheels as illustrated in FIG. 2 such that when the vehicle is lowered as in FIG. 3, the wheels will engage respective of the drives 32.

Once lowered into the tanks, the drive means 32 may be operated to simultaneously or separately effect the rotation of all four wheels thru the water W in the tanks. The level of the water when the wheels are in the lowered position illustrated in FIG. 3 is preferably sufficient to cover the radius of the wheel to where the tire joins the wheel so that inspection transducers 28 and 30, mounted on opposite walls of the tank may transmit ultrasonic energy thru the water to a segment of the tire extending from or near its perifery to where it joins the wheel over a predetermined chordal area. Each of the transducers is preferably of the transmitting-receiving type which both transmits ultrasonic waves generated when the transducer is energized by high frequency electrical energy conducted thereto and receives the reflections of said waves from surfaces placed adjacent the transducer and converts the received energy into electrical signals which may be fed to analyzing equipment which preferably includes a cathode ray tube for presenting the results as visible images or traces thereon.

Since the detection of faults or flaws in materials including rubber by means of reflected ultrasonic energy is a well known art, the electrical systems to which the dual transducers 28 and 30 for each wheel are connected will not be described or shown herein. The operation of said equipment will provide a changing image pattern on the face of an image scope which pattern may be visually analyzed to determine the extent of the flaws or location of foreign bodies such as nails in the rubber of the tires. The drive means 32, which will be described hereafter, are preferably each selectively reversible from the control panel for the apparatus so that the operator may rescan a particular area of a tire to re-evaluate the extent of a flaw. When scanning has been completed, the lift 16 may be operated to the position of FIG. 2 and the cylinders 24 and 26 operated to retract the tanks to the positions of FIG. 1 whereafter the lift 18 may be lowered to permit the vehicle to be driven away.

If a separate tank is used for each wheel, it may be manually positioned under the wheels when raised as in FIG. 2 if mounted on a dolly or carriage which is easily movable. An assembly of a cylinder and tank such as 20 and 24 may also be positionable longitudinally relative to the length of the vehicle to adjust for the wheels of different vehicles. A carriage mounting cylinder 24 may have a tank 20 movable as shown thereon and may be movable along a track parallel to the longitudinal axis of the vehicle for said longitudinal adjustment.

A simple single inspection fixture is illustrated in FIGS. 4 and 5 which consists of a water holding tank 52 which is positionable on a dolly 56 under the wheel 12 of a vehicle 10 which has been lifted by a hydraulic lift ramp of the type available at most garages. The portable inspection rig 50 consists of a tank 52 secured to a frame 55' on the end of the shaft 55 of a hydraulic cylinder 54 which may be controlled by means of a switch on a control panel 66 shown only in the side view, FIG. 5, as being mounted on a chassis or cabinet 64 secured to the dolly 56, preferably at working height. The dolly is mounted on castered wheels 58 or fixed wheels if it is adapted to roll on a track. The tank assembly 52 consists of the tank proper 60 made of sheet metal and having side walls 75 and 76, end walls 78, 79 and a bottom wall 74 which are preferably welded together and leak-proofed. Mounted in the lower part of the central portion of the tank is a cylindrical roller 84 the upper surface of which is adapted to be brought against the rim of the tire 12' and to rotate said tire and its wheel mount 12" about its axle 13 when said roller is power operated to rotate. The roller 84 is preferably rubber or rubber covered so that it will make frictional engagement with the tire and effect said drive without difficulty. The shaft 84S of roller 84 is supported at one side by a bearing secured to the wall 76 and extends at the other side thru wall 75 thru a rotary seal 75S therein into a second housing 85 in which is mounted a drive for said roller.

The drive 86 may consist of a gear-motor or conventional motor adapted when operative to drive the shaft 84S of 84 by means of a chain and sprocket arrangement. Mounted on the side wall 76 in a position to scan a strip area of the lowermost portion of the tire when it is engaging 84, is a first inspection transducer in a housing 82 such as an ultrasonic transducer. Mounted in alignment with 82 on the wall 75 is a second transducer in a housing 80 for scanning the other wall of the tire. The power inputs and signal outputs of said transducers as well as the power inputs to the motor of the drive 86 are connected to the power supplies mounted in the cabinet 62 and the controls and instrumentation mounted in the cabinet 64 by means of wires extending to a cable 72 which is preferably extendable and self contracting to keep it in tension to account for the up and down movement of the tank. The notation 88 refers to a window positioned in an opening in wall 76 for visually positioning the tire against roller 84. The notation 68 refers to a viewing screen or cathode ray tube screen, which tube is mounted at working height at the upper end of 64 and 66 refers to a bank of switches and adjustable controls for the instrumentation and servos of the apparatus. Power may be derived from a flexible cable 61 extending to a source of line current. The ultrasonic energy generator may be mounted in the cabinet 62 and the control circuits for amplifying the reflected signals and modulating the writing means of the display tube 63 may be secured in the housing 64. The manual controls for operating 54 and the servo motor of 86 may also be mounted on the front of 64 for simple access thereto.

The drive means illustrated in FIGS. 4 and 5 may be modified to include powered rollers spaced apart to each engage and effect rotation of the wheel. A further modification in the form of a third transducer 81 may be mounted on a support mounted in a housing 81' extending across the tank and secured to the sidewalls, to scan in a radial direction for inspecting the rubber material on the perifery of the tire. The drive means of FIGS. 4 and 5 may be applied to the apparatus of FIGS. 1 to 3, one for each wheel.

The notation 60H refers to one or more flexible hose lines which may be respectively connected to a remote source of pressurized liquid such as a water tap for adding and removing liquid from the tank, preferably in a flushing action to remove dirt therefrom. In a modified form of the invention, the support for the ultrasonic testing tank 52 may be crank operated to effect its raising and lowering or may be operated by an electric servo and drive. In a simpler form of the invention, the support may be a single beam or frame with vertical adjustment being effected by simply raising and lowering the vehicle on which the wheel 12 is mounted.

Other modifications to the apparatus of FIGS. 4 and 5 are noted as follows:

(a) The inspection transducers mounted in the housings 80 and 82 may either be mounted stationary or movable therein. A single transducer of elongated shape may be provided to scan a strip of chordal section of the tire or wheel without movement of the transducer other than in its vibration. As a further refinement, each of said transducers may be mounted within their respective housings and power driven to move in a short lineal path which is preferably radial to the wheel either while said wheel is in continuous motion or at least once during each pause in its movement. For an intermittent scan of the latter type, the operation of the motor 86 or drive means for the wheel drive roller(s) 84 may be interlocked to the operation of the servo driving each of the transducers along said short lineal paths. The intermittent movement of the drive 86 and the drives for the transducer movements may be automatically controlled by conventional automatic switching or timing means to continue without further action on the part of the operator of the apparatus unless stopped by him by means of a switching control in the control bank 66.

If the wheel 12 is continuously rotated and the transducers are separately or simultaneously made to traverse a short path to effect a radial scan, then the wheel must be rotated slow enough to effect a complete scan of the material of the tire side wall.

(b) The side positioned ultrasonic transducers 28 and 30 in the housings 80 and 82 may also comprise or include means for generating ultrasonic waves in the liquid in the tank of an intensity to effect an eroding or cleaning of the respective side-walls of the wheel 12 or tire thereof. The apparatus of FIGS. 4 and 5 as well as the other apparatus of this invention may thus be used to inspect the material of the wheel or tire and/or clean the sidewalls thereof. The action may be accomplished separately or simultaneously with the inspection function by separately or simultaneously generating the necessary transducer vibrations.

Figure 6:
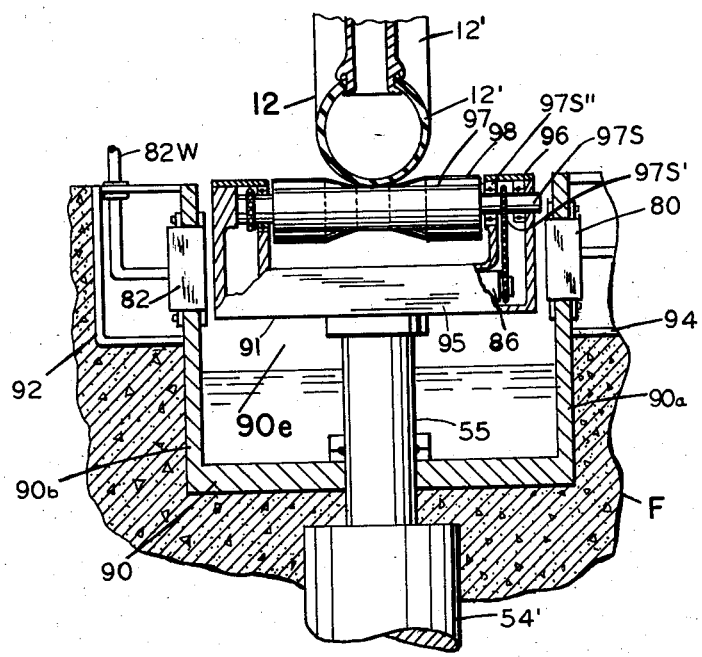
FIG. 6 is an end view of a modified form of the invention with parts removed.
Figure 7:
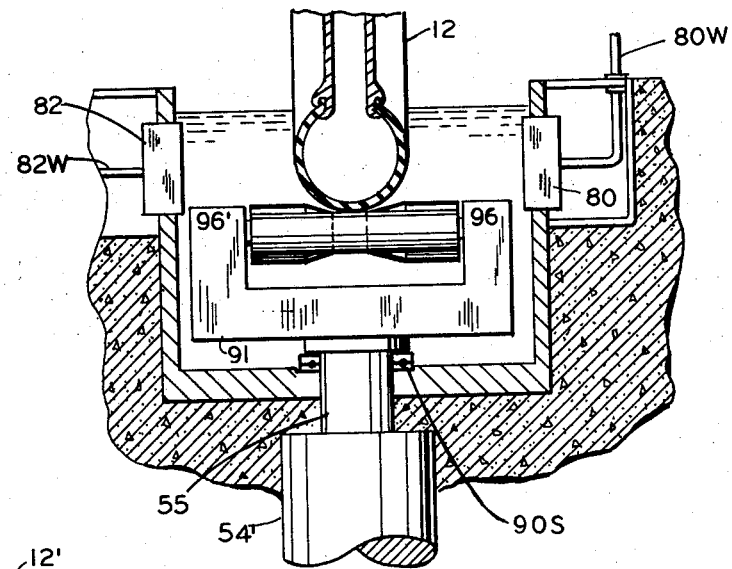
FIG. 7 is the same as FIG. 6 with the wheel of a vehicle lowered into an inspection position.
Figure 8:
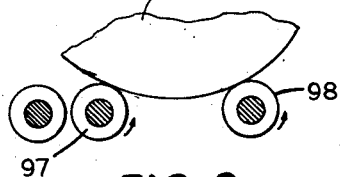
FIG. 8 is a partial view of part of the apparatus of FIGS. 6 and 7.

A modified form of the invention is illustrated in FIGS. 6 and 7 in which either two or four wheels of the vehicle to be inspected are driven onto an inspection fixture and lowered into respective tanks of water until the level thereof reaches near or above the inner radius of the tires. A single tank 90 is illustrated which may either be buried in the floor F or mounted on a frame secured in a pit or comprises a ramp onto which said vehicle may be driven. Movably mounted in the tank 90 is a fixture or frame 91 which mounts a plurality of rollers, two of which 97 and 98 are illustrated in FIG. 8 as being spaced apart and adapted to be power driven in the same direction to rotate the tire 12' on its wheel 12 when in the position illustrated. The rollers are supported in bearing by the inner walls of the legs 96 and 96' of the U-shaped frame 95 which frame is hollow and also mounts the drive means for said rollers which includes a servo motor as described. The notation 97S refers to the shaft of the roller 97 and 97S' to a sprocket connected thereto and driven by a chain extending from a motor 86 which is hermetically sealed within the walls of 95.

The notations 80 and 82 refer to housings for transducers for ultrasonic energy which are mounted on respective side-walls 90a and 90b of the tank 90 and within sub-housings 92 and 94 which extend from said tank for access to the transducers from above. Wires 80W and 82W conduct signals to and from the respective transducers and are connected to wave generating means and instrumentation as described. FIG. 7 shows the lowered position of the wheel 12 with the lower chordal section of the tire completely submerged in the liquid W after the ram 55 of the cylinder or hoist 54' has lowered. The notation 90S refers to a circular seal around the shaft 55 to prevent the liquid in the tank from leaking around said shaft. It is noted that the transducers are completely above the fixture 91 when it is in the lowermost position of FIG. 7.

The apparatus of FIGS. 6 to 8 may be substantially simplified by eliminating the need to lift the frame 91 and lower it into the tank with the vehicle thereon if the tank 90 extends into the floor or driveway for the vehicle and the end walls, one of which 90e is illustrated in FIG. 6, extend oblique to the horizontal plane are properly sloped to permit said vehicle to be driven under its own power into the tank from one end thereof and either back out the same end or thru and out the other end when the inspection functions are completed. The tank 90 may also be made wide enough to accommodate the wheels at both sides of the vehicle and long enough to receive all four wheels below the level of the liquid whereupon the vehicle may be driven to a position on the roller conveying means which would be power operative on a fixed mount with the plane of the tops of the rollers substantially in the plane of the surface of the tank on which said wheels approach said conveyor or pairs of conveyors. The inspection position of the vehicle may be such that each wheel is in alignment with a respective ultrasonic transducer, which transducers may thereafter be individually or simultaneously operated as the wheels are rotated by the rollers on which they rest. The transducers may also be provided in housings which are longitudinally movable in the tank to respective positions opposite or adjacent respective of said wheels.

I claim:

1. An apparatus for inspecting the wheels of a vehicle without removal from said vehicle comprising in combination:
    (a) a movable racking means for receiving a vehicle and positioned at a level relative to a roadway whereby said vehicle may be self powered thereon,
    (b) a reservoir containing a liquid beneath said racking means,
    (c) means for lowering said racking means with the vehicle thereon whereby to immerse the wheels of the vehicle a predetermined degree into said liquid,
    (d) an ultrasonic inspection means positioned beneath the surface of said liquid and comprising a plurality of ultrasonic transducers at least one of which is positioned adjacent each side wall of the wheels of the vehicle immersed in said liquid,
    (e) means for operating said ultrasonic inspection means to scan a predetermined portion of the wall of each wheel and to provide a visual means for indicating the condition of the material of said wheel,
    (f) means mounted on said apparatus for power rotating each wheel under inspection while immersed in said liquid, and
    (g) means for raising said racking means to a level whereby said vehicle may be power driven off said apparatus onto said roadway when inspection is completed.

2. Wheel inspection apparatus comprising in combination with a wheeled vehicle,
    means for lifting said vehicle to free the wheels thereof from floor contact permitting their free rotation on said vehicle,
    a container having a liquid therein, said container being open at the top,
    means for relatively moving said container and said vehicle to position a wheel of said vehicle in said container, with the lower portion of said wheel immersed in said liquid,
    an ultrasonic transducing means operative to generate and transmit wave energy in said liquid for inspecting said wheel,
    receiver transducing means coupled to said liquid for receiving said ultrasonic energy after pasing through part of said wheel.
    means coupled to said receiver transducing means for indicating characteristics of the internal structure of said wheel, and
    wheel rotating means mounted within said container in a position to frictionally engage the surface of a wheeled mounted on a vheicle and inserted into said container and to rotate said wheel whereby a circumferential portion of said wheel may be scanned by said transducing means.

3. Wheel inspection apparatus in accordance with claim 2, the wheels of said wheeled vehicle having rubber tires mounted thereon, said wheel rotating means being disposed in the bottom of said container in a position to engage the lower peripheral surface of the tire of a wheel upon insertion of said wheel into said container.

4. Apparatus in accordance with claim 3, said wheel rotating means comprising a friction drive roll adapted for rotation about a substantially horizontal axis in the bottom of said container, a motor coupled to said drive roll for rotating same, the peripheral surface of said drive roll adapted to abut and frictionally engage the peripheral surface of said tire on the wheel of said vehicle whereby to rotate said wheel through said liquid.

5. Apparatus in accordance with claim 3 including a plurality of transducers each operative to generate and direct energy through said liquid and said wheel and to also receive energy reflected back through respective portions of said wheel and transduce said energy to electrical signals for simultaneously scanning different portions of said wheel from different directions.

6. Apparatus in accordance with claim 2, said ultrasonic energy generating means and said receiving means comprising a single transducer which is operative to generate and direct energy through said liquid and said wheel and to also receive energy reflected back through a portion of said wheel.

7. Apparatus in accordance with claim 2, said vehicle having wheels with inflated rubber tires mounted thereon, said ultrasonic energy generating and receiving transducing means comprising a plurality of single transducers each operative to both generate and receive ultrasonic energy for inspecting by pulse-echo means, said transducers being disposed on both sides of the wheel of a vehicle inserted into said container and operative to scan respective side walls of a tire inserted and rotated therein by said wheel rotating means.

8. Apparatus in accordance with claim 2 including a fixture for supporting said container, said fixture having a wheeled base, a mount for said container movable up and down on said base, power means for raising and lowering said container relative to said base whereby the container may be moved to a position under a vehicle wheel and lifted to cause insertion of said wheel into said liquid against said wheel rotating means.

9. Apparatus in accordance with claim 8 including a visual flaw detecting means secured to said wheeled base and coupled to said receiver transducing means for analyzing the internal structure of a vehicle wheel.

10. Wheel inspection apparatus comprising in combination with a wheeled vehicle, means for lifting said vehicle to free the wheels thereof from floor contact permitting their free rotation on said vehicle, a container having a liquid therein and open at the top, means for lifting said container under a vehicle having its wheels free to rotate to place a wheel of said vehicle in said container with the lower portion of said wheel immersed in said liquid, an ultrasonic transducing means operative to generate and transmit wave energy through said liquid for inspecting said wheel, receiver transducing means coupled to said liquid for receiving said ultrasonic energy after passing through part of said wheel and converting the received energy to electrical signals, further transducing means operative to receive said electrical signals and indicate characteristics of the internal structure of said wheel and wheel rotating means operative to engage a portion of the peripheral surface of a wheel inserted into said container and to rotate said wheel whereby a circumferential portion of said wheel may be scanned by said transducing means.

11. Apparatus for simultaneously subjecting both side walls of a wheel on a vehicle to ultrasonic energy without removal of said wheel from said vehicle comprising in combination:

(a) means for lifting said vehicle to free the wheels thereof from floor contact permitting their free rotation on said vehicle, (b) a container having a liquid therein, said container being open at the top, (c) ultrasonic transducing means operative to simultaneously generate and transmit wave energy through said liquid in two directions whereby said energy is directed at both sides of a wheel inserted into said container, (d) means for relatively moving said container and said vehicle to position a wheel of said vehicle in said container with the lower portion of said wheel immersed in said liquid, and (e) wheel rotating means mounted within said container in a position to frictionally engage the lower peripheral surface of a wheel inserted into said container and to rotate said wheel whereby a circumferential portion of both sides thereof will be subjected to said ultrasonic energy.

References Cited in the file of this patent
UNITED STATES PATENTS

| | | |
|---|---|---|
| 2,378,237 | Morris | June 12, 1945 |
| 2,722,829 | Ringering | Nov. 8, 1955 |
| 2,798,379 | Merrill et al. | July 9, 1957 |

FOREIGN PATENTS

| | | |
|---|---|---|
| 701,455 | Great Britain | Dec. 23, 1953 |